United States Patent
Mignot et al.

(10) Patent No.: US 10,655,822 B2
(45) Date of Patent: May 19, 2020

(54) CONFIGURABLE OPTICAL MODULE AND LED ASSEMBLY

(71) Applicant: SIGNIFY HOLDING B.V., Eindhoven (NL)

(72) Inventors: Nicolas Mignot, Genas (FR); Romain Hameau, Eindhoven (NL); Stephan Certain, Jonage (FR); Thibaut Gamonal, Lyons (FR); Remi Noirot, Amberieux en Dombes (FR); Lionel Portay, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/324,521

(22) PCT Filed: Jul. 13, 2017

(86) PCT No.: PCT/EP2017/067751
§ 371 (c)(1),
(2) Date: Feb. 8, 2019

(87) PCT Pub. No.: WO2018/028926
PCT Pub. Date: Feb. 15, 2018

(65) Prior Publication Data
US 2019/0178473 A1    Jun. 13, 2019

(30) Foreign Application Priority Data

Aug. 9, 2016  (EP) .................................. 16183375

(51) Int. Cl.
*F21V 17/00* (2006.01)
*F21V 5/00* (2018.01)
(Continued)

(52) U.S. Cl.
CPC ............ *F21V 17/005* (2013.01); *F21V 5/007* (2013.01); *F21V 17/02* (2013.01); *F21V 14/06* (2013.01);
(Continued)

(58) Field of Classification Search
CPC ........ F21V 17/005; F21V 5/007; F21V 17/02; F21V 14/04; F21V 14/06; F21Y 2105/10;
(Continued)

(56) References Cited

U.S. PATENT DOCUMENTS

| 9,273,832 B2 | 3/2016 | Van Gompel et al. |
| 2011/0032707 A1* | 2/2011 | Takashige ............... F21V 17/02 362/277 |

(Continued)

FOREIGN PATENT DOCUMENTS

| CN | 202267003 U | 6/2012 |
| EP | 2966346 A1 | 1/2016 |

(Continued)

*Primary Examiner* — Y M. Lee
(74) *Attorney, Agent, or Firm* — Daniel J. Piotrowski (57) ABSTRACT

An optical module (30) for a LED assembly (1) is disclosed. The optical module comprises a plurality of optical elements (31) and a plurality of mounting structures (40), each mounting structure comprising a stepped arrangement of mounting elements, in which each mounting element defines a step of the stepped arrangement, each step defining a different mounting height for the optical module. Also disclosed are a LED assembly including such an optical module, a luminaire including such a LED assembly and a method of assembling such a LED assembly.

13 Claims, 11 Drawing Sheets

(51) Int. Cl.
*F21V 17/02* (2006.01)
*F21Y 105/10* (2016.01)
*F21Y 115/10* (2016.01)
*G02B 19/00* (2006.01)
*F21V 14/06* (2006.01)

(52) U.S. Cl.
CPC ....... *F21Y 2105/10* (2016.08); *F21Y 2115/10* (2016.08); *G02B 19/0066* (2013.01)

(58) Field of Classification Search
CPC ... F21Y 2115/10; G02B 19/0066; G02B 7/00; G02B 7/16
See application file for complete search history.

(56) References Cited

U.S. PATENT DOCUMENTS

2013/0170216 A1* 7/2013 Li ........................ F21V 17/06
362/319
2013/0301264 A1 11/2013 Van Gompel et al.
2014/0192529 A1 7/2014 Wilcox

FOREIGN PATENT DOCUMENTS

| | | | |
|---|---|---|---|
| JP | 2009049239 | A | 3/2009 |
| JP | 2009230984 | A | 10/2009 |
| WO | 2016049337 | A1 | 3/2016 |

* cited by examiner

CONFIGURABLE OPTICAL MODULE AND LED ASSEMBLY

CROSS-REFERENCE TO PRIOR APPLICATIONS

This application is the U.S. National Phase application under 35 U.S.C. § 371 of International Application No. PCT/EP2017/067751, filed on Jul. 13, 2017 which claims the benefit of European Patent Application No. 16183375.1, filed on Aug. 9, 2016. These applications are hereby incorporated by reference herein.

FIELD OF THE INVENTION

The present invention relates to an optical module for a LED assembly, the optical module comprising a plurality of optical elements and a mounting surface comprising a plurality of mounting posts.

The present invention further relates to a LED assembly comprising such an optical module.

The present invention further relates to a luminaire comprising such a LED assembly.

The present invention further relates to a method of assembling such a LED assembly.

BACKGROUND OF THE INVENTION

Solid state lighting (SSL) such as LED lighting is becoming increasingly popular because of the energy efficient nature of such lighting as well as the lifetime of such lighting. Consequently, traditional light sources such as incandescent lamps and halogen lamps are being replaced with LED lighting.

In most applications, a LED lamp comprises a plurality of SSL elements, i.e. individual LEDs to produce the desired luminous flux. Such LEDs may be arranged on a carrier such as a printed circuit board (PCB) in a regular or irregular pattern, e.g. a grid of LEDs. In order to achieve the desired luminous distribution from such an arrangement, the carrier may form part of a LED assembly in which one or more optical modules are positioned over the carrier. An example of such an assembly is disclosed in US 2014/0192529 A1. Such LED assemblies for example are commonly used in outdoor luminaires. This is explained in more detail with the aid of FIG. 1, which schematically depicts such a LED assembly 1 in an exploded perspective view, and FIG. 2, which schematically depicts a cross-sectional view of part of such an assembly.

Figure 1:
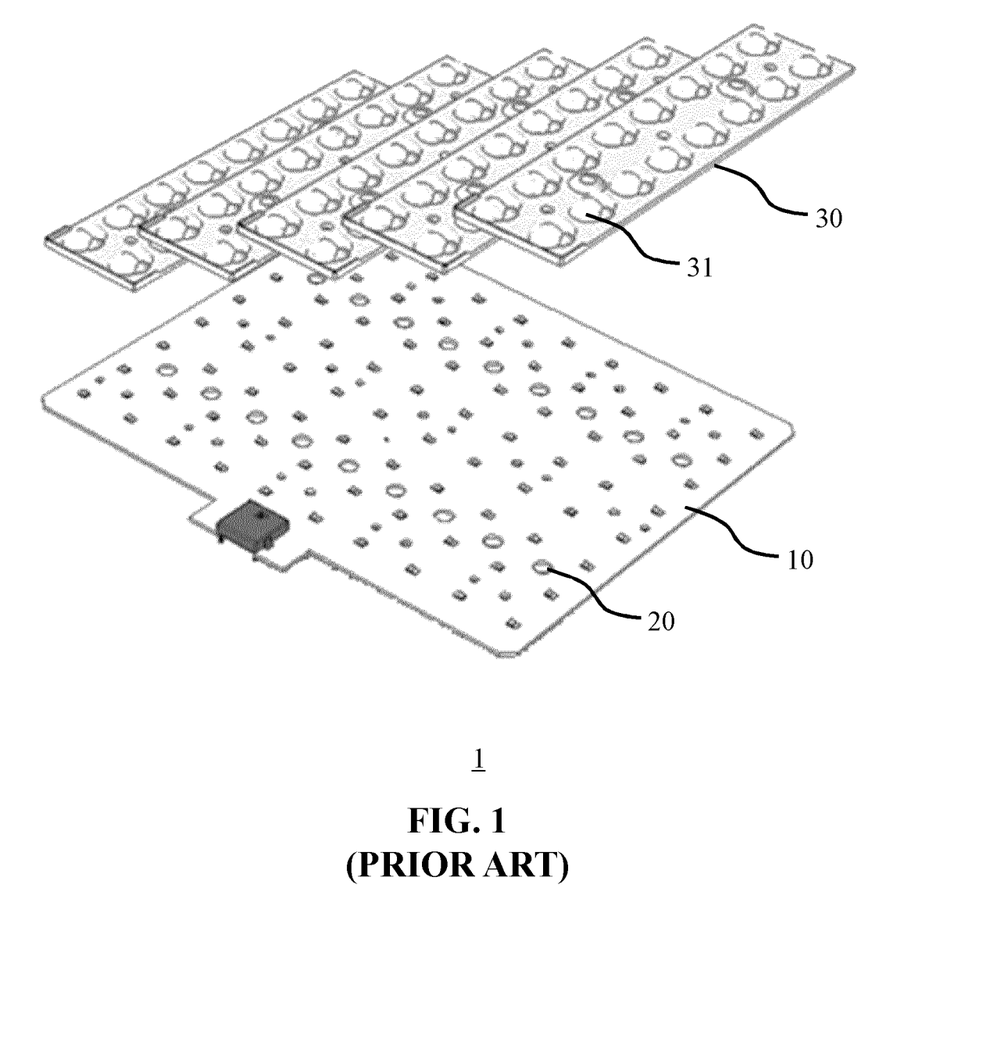
FIG. 1 schematically depicts an exploded view of a prior art LED assembly.

The prior art LED assembly 1 comprises a carrier 10, e.g. a PCB, onto which a plurality of LEDs 20 are mounted in a regular pattern. Here, a plurality of optical modules 30 are mounted on the carrier 10 such that each LED 20 is aligned with an optical element 31, e.g. a collimator, lens or the like, of the optical module 30 to shape the optical output of the LED 20, e.g. to convert the Lambertian luminous distribution of the LED 20 into a (more) collimated luminous output. A number of optical modules 30 may be combined to form an optical plate covering the carrier 20 in case of a large area carrier 20, which may be desirable to avoid the manufacture of an overly large single optical module 30 acting as an optical plate, e.g. for cost reasons.

Figure 2:
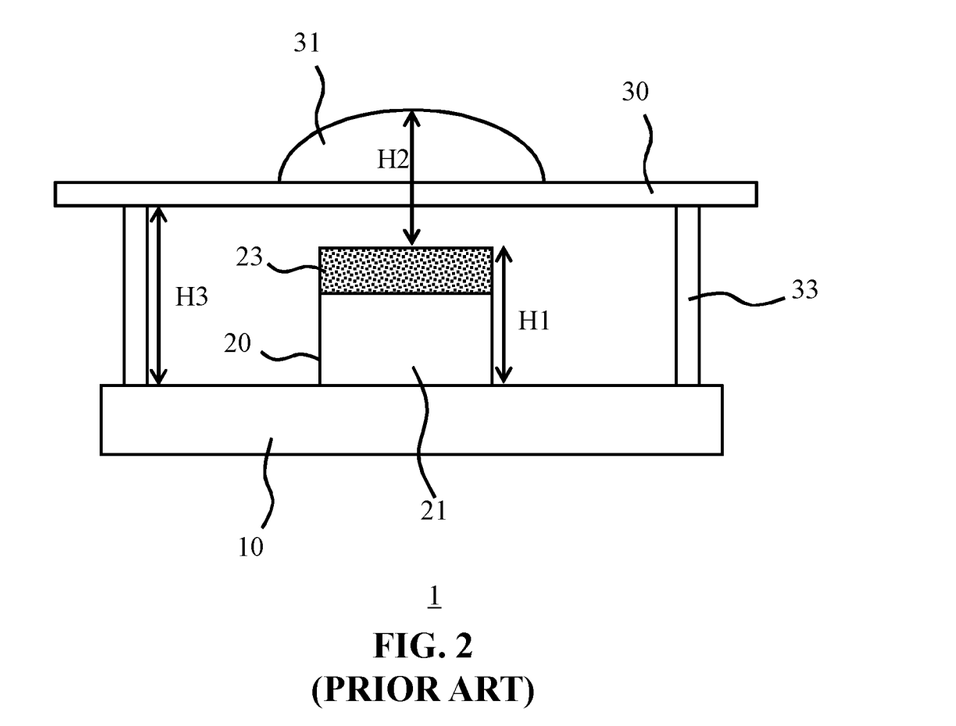
FIG. 2 schematically depicts a cross-section of a prior art LED assembly.

As can be seen in FIG. 2, and as can be readily understood by the skilled person, in order for the optical element 31 to perform its desired optical function, the optical element 31 needs to be positioned at the correct distance H2 from the LED 20, e.g. the focal distance of the optical element 31. To this end, the optical module 30 may comprise a plurality of mounting posts 33 that define a height H3 at which the optical module is positioned over the carrier 10, thereby optically aligning each optical element 31 with a LED 20 on the carrier 10.

However, different types of LED 20 may have different heights H1, for example because the substrate 21 of the LED 20 and/or one or more light conversion layers 23, e.g. phosphor layers, may have different thicknesses. Consequently, whenever a type of LED 20 is changed on a carrier 10, e.g. to alter the luminous flux of the LED assembly 1, to replace a LED 20 with a cheaper alternative, and so on, this typically causes a change in the height H1. As will be understood from the above, this therefore also requires a change of optical module 30 in order to ensure that the optical module has the correct mounting height H3 relative to the carrier 10 such that each optical element 31 is positioned at the correct height H2 over the LED 20, as use of an optical module 30 at an incorrect height H3 such that the optical elements 31 are positioned over the LEDs 20 at an incorrect height H2 may cause the LED assembly 1 to produce a suboptimal luminous output, i.e. a luminous output having a suboptimal luminous distribution, e.g. a blurred luminous output, a luminous output with an incorrect degree of collimation, and so on.

Having to replace the one or more optical modules 30 each time the LEDs 20 on the carrier 10 are being replaced with an alternative is rather costly. What is more, before the optical modules 30 can be manufactured, a decision has to be made about which LED 20 is going to be used on the carrier 10 in order to ensure that the mounting posts 33 of the optical modules 30 are set to the appropriate height H3. Consequently, it is not possible to make a last-minute decision about which LEDs 20 to use on the carrier 10, which may be desirable for instance for economic reasons, i.e. such that the manufacturer of the LED assembly 1 can choose the cheapest suitable LED 20 available on the market. This is an important consideration in the field of solid state lighting, where profit margins are notoriously suppressed due to the high levels of competition in this field.

JP2009230984 discloses a lens mounting substrate to be mounted with a lens, said lens having a fixed leg body for changing the mounting height of the lens.

SUMMARY OF THE INVENTION

The present invention seeks to provide an optical module that may be used with different types of LEDs on a carrier.

The present invention further seeks to provide a LED assembly comprising at least one such an optical module and a carrier comprising a plurality of LEDs.

The present invention further seeks to provide a luminaire comprising such a LED assembly.

The present invention further seeks to provide an assembly method of such a LED assembly.

According to an aspect, there is provided an optical module for a LED assembly, the optical module comprising a plurality of optical elements and a plurality of mounting structures, each mounting structure comprising a stepped arrangement of mounting elements in which each mounting element defines a step of the stepped arrangement, each step defining a different mounting height for the optical module, and wherein each mounting structure is rotatable.

Such an optical module may be placed on a carrier comprising a plurality of apertures for engaging with the mounting posts, wherein each aperture is shaped to receive part of the stepped surface of one of said mounting posts such that one of the steps of said stepped surface contacts the carrier adjacent to said aperture. In this manner, the stepped surface may be positioned relative to the receiving aperture such that the step defining the appropriate mounting height for the LEDs on the carrier is positioned on the carrier. Hence, by having multiple steps each having an appropriate mounting height for a different particular LED, an optical module is provided that may be used with a carrier on which the height of the identical LEDs may be varied, thereby avoiding the need to manufacture optical modules that are specific to a carrier carrying LEDs having a particular height. This therefore reduces the manufacturing cost of LED assemblies including such an optical module and facilitates more flexibility in the design choice of the LED assembly, e.g. the choice for a particular LED at later stages of the manufacturing process, typically after the optical module has been manufactured.

In addition, assembly errors, e.g. the positioning of an optical module at an incorrect height relative to the LEDs on the carrier, can be prevented in embodiments of the present invention by the provision of a carrier in which apertures are provided in such a manner that upon positioning of the optical module on the carrier, only the steps having the desired step height will contact the carrier, with the higher steps being received by the apertures. Hence, the apertures (if required) of each carrier may be dimensioned and positioned as a function of the height of the LEDs on the carrier, such that the optical module, when correctly positioned on the carrier, will be automatically set at the correct height by the interaction of the steps of the mounting structures of the optical module with the carrier and its apertures.

In order to improve the stability of the optical module when positioned on a carrier, each mounting structure may comprise a plurality of sections defining a surface of the mounting structure, each section comprising said stepped arrangement. Such sections for example may combine to define a perimeter of the mounting structure, e.g. a mounting post.

Each mounting structure is rotatable in the plane of the optical module and around an axis perpendicular to said plane of the optical module, such that the correct mounting height of the optical module on the carrier carrying the LEDs may be selected by rotating each mounting structure. This allows for the use of universal carriers, e.g. carriers having appropriately shaped apertures in fixed locations on the carrier, as the position of the apertures does not need to be aligned with the steps to be received by the apertures.

In some embodiments, the mounting structure may be formed by discrete, spatially separated elements in fixed positions on the optical module. For example, each mounting element may be a mounting pin extending substantially perpendicular from the plane of the optical module such that the stepped arrangement is provided by a plurality of mounting pins of different heights.

The optical module may further comprise a screw hole extending through the optical module, e.g. through a mounting post, for affixing the optical module to a LED carrier with screws or the like. At least one stepped arrangement of mounting elements may be arranged around a perimeter section of the screw hole. This has the further advantage of reinforcing the optical module, as the risk of cracking or otherwise damaging the optical module by the forces applied when screwing the optical module to the LED carrier is reduced due to the presence of the stepped arrangement (partially) around the screw hole.

The optical module may be made of an optical grade polymer, e.g. a polymer such as polycarbonate (PC), poly (methyl methacrylate) (PMMA), poly ethyleneteraphtalate (PET), or the like, which facilitates cost-effective manufacturing of the optical plate and the mounting posts, e.g. through injection molding or the like.

According to another aspect, there is provided a LED assembly including a carrier comprising a pattern of LEDs and at least one optical module of any of the herein described embodiments positioned on the carrier such that each optical element is optically aligned with one of said LEDs and one of the mounting elements of the respective mounting structures contacts the carrier to set the optical module at the correct height above the LEDs. Where the appropriate mounting element is not the highest mounting element of the stepped arrangement, i.e. does not have the greatest step height, the carrier may comprise a plurality of apertures, each aperture shaped to receive part of the stepped arrangement of one of said mounting structures such that one of the mounting elements of said stepped arrangement contacts the carrier adjacent to said aperture, with at least the mounting elements of the stepped arrangement that are higher than the mounting element contacting the carrier are received by the aperture. Such an assembly benefits from the fact that the one or more optical modules are usable with different sized LEDs, i.e. LEDs having different heights, thereby reducing the overall manufacturing costs of different LED assemblies using the same carrier with different sized LEDs as well as increasing design freedom by allowing the choice of LEDs to be used with the carrier to be made after manufacturing of the optical module.

In an embodiment, the LED assembly comprises a plurality of said optical modules, said optical modules combing to form an optical assembly such as an optical plate. This further reduces the cost of the LED assembly as the manufacture of an expensive single piece optical plate is avoided, e.g. by avoiding the need to dispose of the entire optical plate in case of a manufacturing fault.

According to another aspect, there is provided a luminaire comprising a housing, said housing comprising the LED assembly of any of the herein described embodiments. Such a luminaire, e.g. an outdoor luminaire, may be manufactured in a more cost-effective manner due to the lower manufacturing cost of the LED assembly.

According to another aspect, there is provided a method of assembling a LED assembly, the method comprising providing an optical module comprising a plurality of optical elements and a plurality of mounting structures, each mounting structure comprising a stepped arrangement of mounting elements, in which each mounting element defines a step of the stepped arrangement, each step defining a different mounting height for the optical module; providing a carrier comprising a pattern of LEDs and positioning the optical module on the carrier such that one of the mounting elements of the respective mounting structures contacts the carrier and each optical element is optically aligned with one of said LEDs, wherein each mounting structure is a rotatable mounting structure, the method further comprising setting the mounting height of the optical module by rotating each mounting structure to select the step of the plurality of steps to contact the carrier.

Where the mounting elements of the respective mounting structures contacting the carrier are not the highest mounting elements of the stepped arrangement, the method may further comprise forming a plurality of apertures in said carrier, each aperture shaped to receive part of the stepped arrangement of one of said mounting structures such that a selected one of the steps of said stepped arrangement contacts the carrier adjacent to said aperture. This assembly method facilitates the reuse of the same optical module for carriers carrying different height LEDs as a step with a different mounting height of the mounting posts of the optical module may be positioned on the carrier adjacent to the aperture receiving the remainder of the steps of this plurality of steps to ensure that the optical elements of the optical module are set at the appropriate height above their respective LEDs.

Each mounting structure is a rotatable mounting structure, the method further comprising setting the mounting height of the optical module by rotating each mounting structure to select the step of the plurality of steps to contact the carrier. This has the advantage that universal carriers having apertures in fixed positions may be used, which may further reduce the cost of the manufacturing process of such LED assemblies.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

Figure 3:
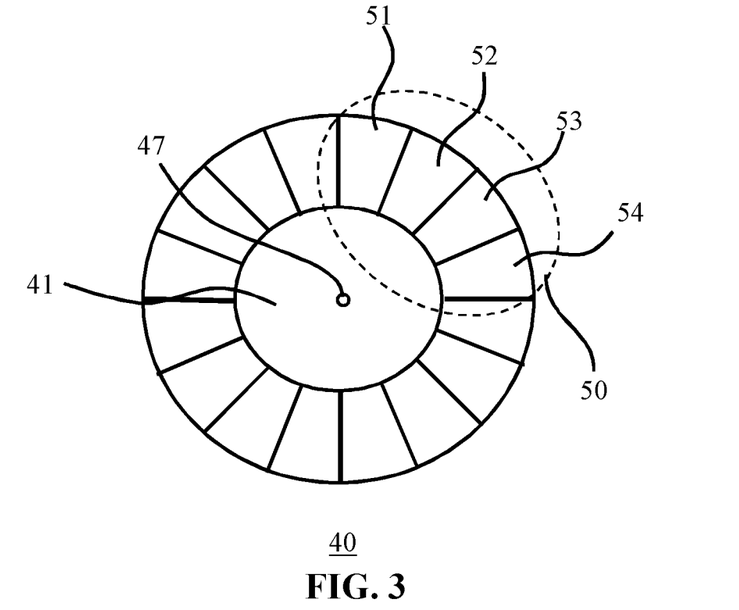
FIG. 3 schematically depicts a bottom view of an aspect of an optical module for a LED assembly according to an embodiment.
Figure 4:
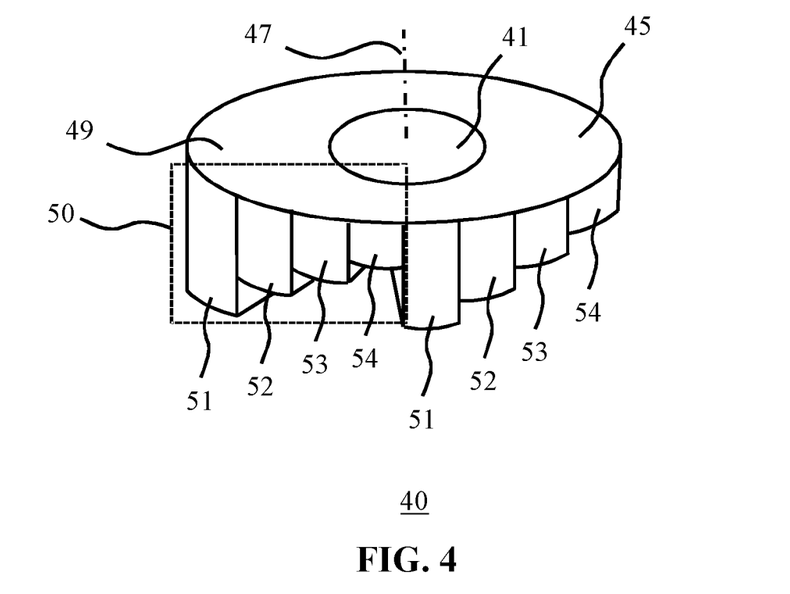
FIG. 4 schematically depicts a perspective view of an aspect of an optical module for a LED assembly according to an embodiment.

FIG. 3 schematically depicts a bottom view and FIG. 4 schematically depicts a perspective view of a mounting structure, here a mounting post 40, of an optical module 30 according to an example embodiment of the present invention. In this example embodiment, the mounting structure 40 has a circular cross-section in the plane of the optical module 30 and has a mounting surface 45 to be positioned on the carrier 10 carrying LEDs 20. The mounting surface carries one or more stepped arrangements of mounting elements or steps 51-54, which may define a perimeter of the mounting surface 45 in some embodiments. For example, the mounting arrangements may delimit a screw hole 41 extending through the mounting post 40, which screw hole 41 is for receiving a screw or the like for affixing the optical module 30 to a carrier 10 although in alternative embodiments the screw holes 41 may not form part of the mounting posts 40, i.e. may be separate screw holes 41, in which case the mounting surface 45 may be a solid or closed surface.

Each step 51-54 is shown to radially extend from a central axis 47 of the mounting surface 45 by way of non-limiting example only. Other suitable stepped arrangements will be immediately apparent to the skilled person, e.g. linear stepped arrangements in which the steps 51-54 are linearly arranged; the chosen arrangement of the steps is not particularly critical to the present invention as long as a plurality of steps each having a different step height is provided. The mounting surface 45 of the mounting post 40 may be divided in a plurality of sections 50, each comprising the plurality of mounting elements or steps 51-54, which sections 50 may combine to form the stepped profile of the mounting surface 45. For example, the sections 50 may combine to define a perimeter of the mounting surface 45. The presence of multiple sections 50 may increase the stability of the optical module 30 on the carrier 10 because multiple steps, i.e. the same steps of different sections 50 contact the carrier 10, such that the mounting post 40 is mounted on the carrier 10 in several locations, which locations preferably are regularly distributed across the mounting surface 45 to increase stability of the optical module 30.

The various mounting elements 51-54 extend from the mounting surface 45 (in a direction along the central axis 47) by different amounts, such that the optical module 30 may be positioned at different mounting heights on the carrier 10 as will be explained in more detail below. The step heights of each of the mounting elements or steps 51-54 may be defined in any suitable manner. For example, a fixed step height difference between neighboring steps, e.g. a step height difference of 0.1 mm, may be used such that the optical module 30 may be used with a range of LEDs 20 having different heights H1 in a range covered by the step height range of the steps 51-54. This for instance may be advantageous in a scenario where there is a certain tolerance, e.g. a 0.05 mm tolerance, in the height H2 as shown in FIG. 2. By setting the step height increments of the steps 51-54 at twice this tolerance, it will always be possible to select via rotation a step 51-54 having a step height that leads to a mounting height H3 on the carrier 10 within the tolerance in the height H2 between the LED 20 and the optical element 31 aligned with the LED 20. Alternatively, a manufacturer of the LED assembly 1 may have a shortlist of LEDs 20 from which the manufacturer may wish to choose the LED to be mounted on the carrier 10, with each of these LEDs having its specific height H1. In such a scenario, the various steps heights of each of the steps 51-54 may be set in accordance with each of the specific heights H1 of the shortlist of LEDs 20, such that for each of the LEDs on the shortlist the mounting post 40 comprises a step 51-54 that when selected sets the optical module 30 at the appropriate mounting height H3 for the selected LED.

At this point, it is noted for the avoidance of doubt that the mounting posts 40 of the optical module 30 may have any suitable number of sections 50 and/or any suitable number of mounting elements or steps 51-54. In particular, it should be understood that in the figures of the present application, the mounting posts 40 have four sections 50 each comprising four steps 51-54 by way of non-limiting example only and that the mounting posts 40 may have fewer or more sections 50 and/or having fewer or more steps 51-54, e.g. per section 50.

Such an optical module 30 may be advantageously used in an assembly process of a LED assembly in which a carrier 10 is provided that is configured such that only one of the mounting elements or steps 51-54 of the mounting posts 40 contacts the carrier 10, i.e. the mounting element having the appropriate step height for the LEDs 20 on the carrier 10. By using the optical module 30 in combination with such a preconfigured carrier 10, it is difficult if not impossible to incorrectly assemble the LED assembly, as the optical module 30 can only slot into place onto the carrier 10 in the intended manner, as will be explained in more detail below.

The optical module 30 may be made of any suitable material, for example glass or an optical grade polymer such as an optical grade PC, PMMA, PET or a transparent casting plastic, or silicon, for example. Manufacture of the optical module 30 from an optical great polymer has the advantage that the optical module 30 may be manufactured a cost-effective manner, e.g. using a molding technique such as injection molding. As previously explained, the mounting posts 40 are separate components that are rotatably mounted around axis 47 in the optical module 30. The mounting posts 40 may be made of any suitable material although the mounting posts 40 preferably are made of the same material (or a material having the same thermal expansion coefficient) as the optical module 30 such as to match the thermal behaviour, e.g. thermal expansion, of the mounting posts 40 to the optical module 30.

Figure 5:
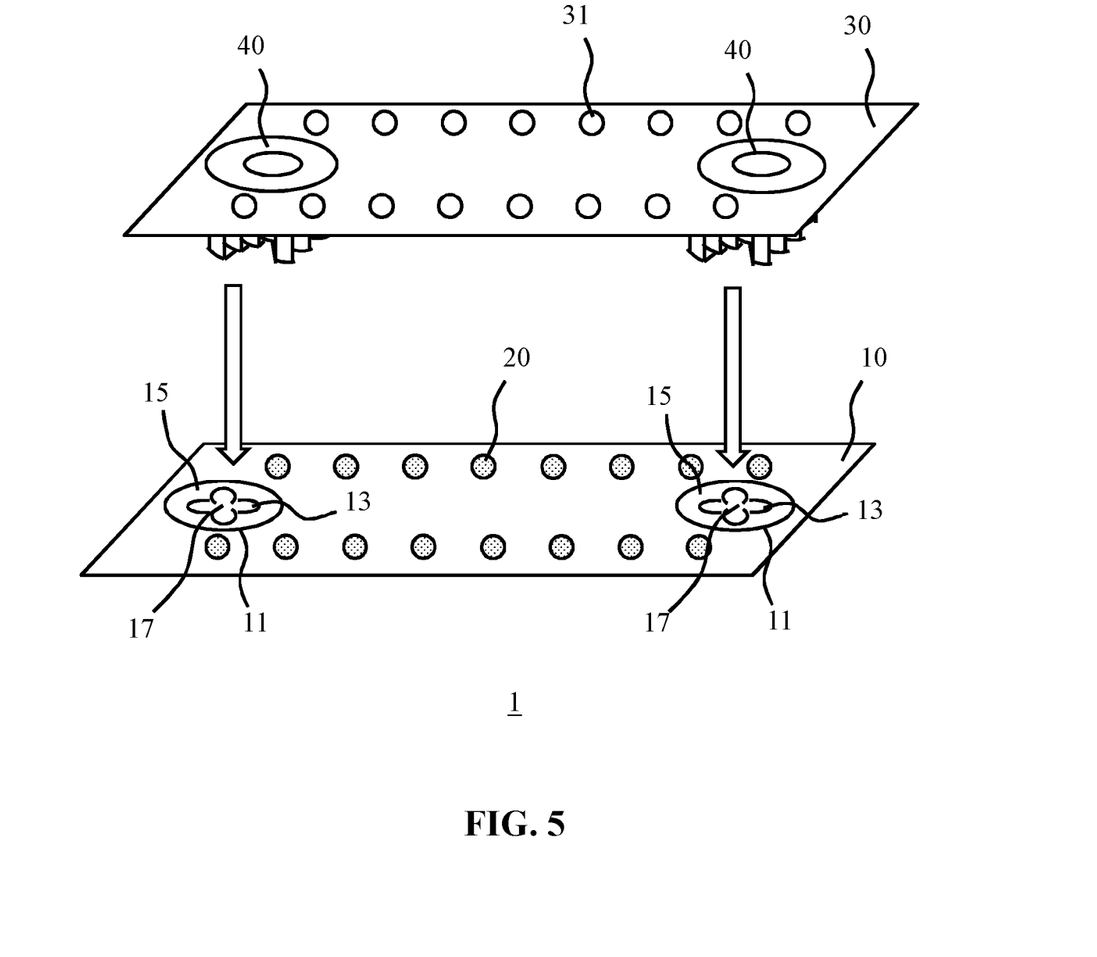
FIG. 5 schematically depicts an exploded view of a LED assembly and its assembly method according to an embodiment.

FIG. 5 schematically depicts an exploded view of a LED assembly 1 according to an embodiment of the present invention. The LED assembly 1 comprises a carrier 10 carrying a plurality of LEDs 20 in a defined pattern, e.g. a grid of LEDs 20, which may be arranged at a constant pitch although this is not essential, as well as one or more optical modules 30 as described above, e.g. optical modules 30 having fixed mounting posts 40 in addition to the optical elements 31 for shaping the luminous output of the LEDs 20. As will be readily understood by the skilled person, the optical elements 31 are typically arranged in the same pattern as the LEDs 20 such that upon correct positioning of the one or more optical modules 30 on the carrier 10, each optical element 30 is optically aligned with a corresponding LED 20. The carrier 10 may be any suitable carrier, e.g. a PCB, a heatsink, a PCB including a heatsink, and so on. Many suitable carriers will be immediately apparent to the skilled person and it should be understood that the present invention is not limited to a particular type of carrier 10. Similarly, any suitable type of LED 20 may be used to be mounted on such a carrier 10.

The carrier 10 further comprises a plurality of mounting regions 11 for receiving the respective mounting posts 40 of the one or more optical modules 30. Each mounting region 11 comprises an aperture 13 that is dimensioned such that all but one of the mounting elements or steps 51-54 of the one or more stepped arrangements on the mounting surface 45 of the mounting post 40 may be received by the aperture 13. Adjacent to the aperture 13 is a landing region 15 of the mounting region 11 for the remaining step portion or step of the mounting surface 45 of the mounting post 40, which remaining step portion defines the mounting height of the optical module 30 on the carrier 10. In case of the mounting surface 45 comprising multiple regions 50, each aperture 13 may comprise a plurality of aperture regions or tabs, with each aperture region of the aperture 13 corresponding to one of the sections 50 of the mounting surface 45. Each aperture 13 optionally may further comprise a central region 17 for receiving a screw extending through the screw hole 41 of the mounting post 40 in case of such a screw hole 41 being present in the mounting post 40.

Figure 6:
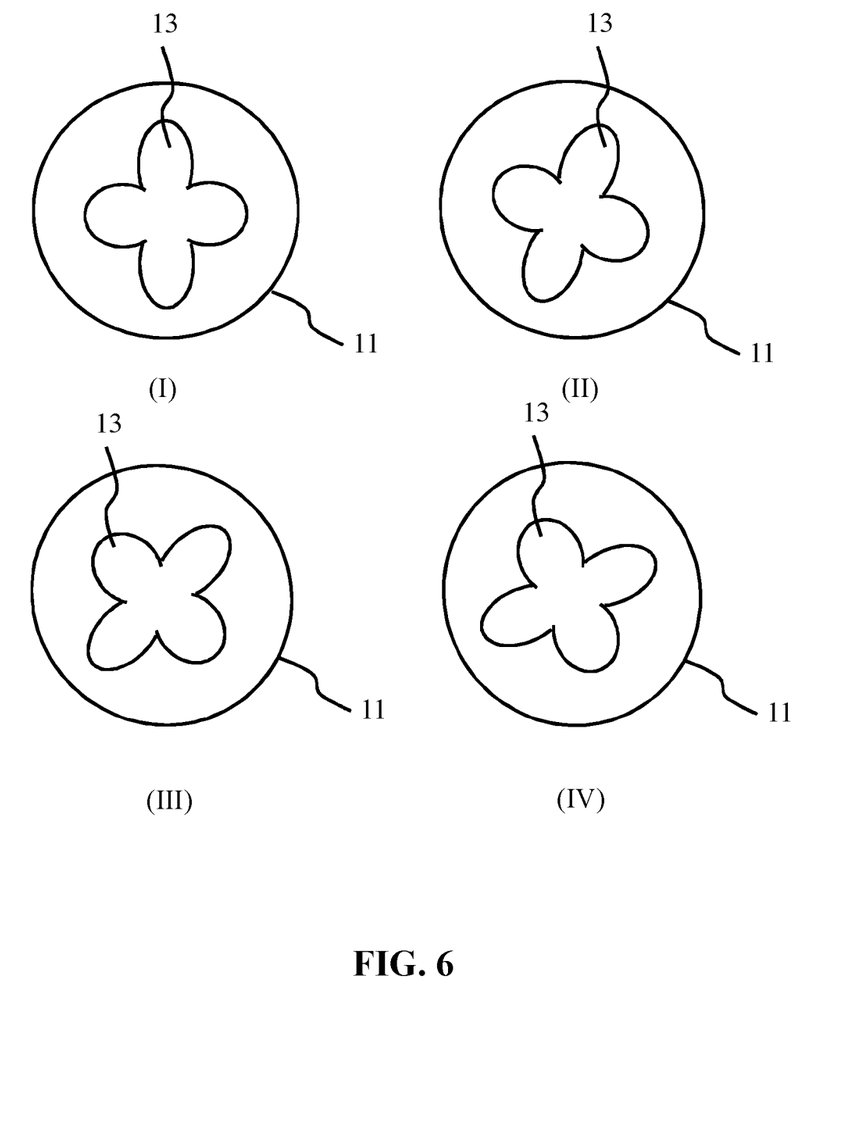
FIG. 6 schematically depicts different orientations of a LED carrier aperture arrangement of the LED assembly of FIG. 5.

The aperture 13 serves as a keyhole for the mounting post 40 in that it receives those steps of the steps 51-54 that are not to be used in defining the height of the optical module 30 over the carrier 10. To this end, once it is known which LED 20 is to be mounted on the carrier 10, the desired mounting height H3 of the optical module 30, i.e. the mounting height H3 required for the correct shaping of the luminous output of the chosen LED 20 by the optical elements 31, is also known, such that at this stage it will be clear which of the mounting elements or steps 51-54 should be brought into contact with the carrier 10 to ensure that the optical module 30 is mounted at the correct mounting height H3. At this stage, the carrier 10 may be (pre-)configured by forming the apertures 13 in the carrier 10 to select which of the steps 51-54 of respective stepped mounting surfaces 45 of the mounting posts 40 is to be received by the aperture 13. This is schematically depicted in FIG. 6, in which the orientation of the aperture 13 within the mounting region 11 is altered as a function of which steps of the steps 51-54 of a mounting post 40 should be received by the aperture 13. In other words, in this embodiment the mounting region 11 is 'rotated' by forming the aperture 13 in different rotational orientations in the respective configurations (I)-(IV) to ensure that the appropriate step 51, 52, 53 or 54 lands on the landing region 15 adjacent to the aperture 13. This is explained in further detail with the aid of FIG. 7-10, which each schematically depict a cross-section of the interaction of a mounting post 40 with a mounting region 11 of the carrier 10 in different configurations.

Figure 7:
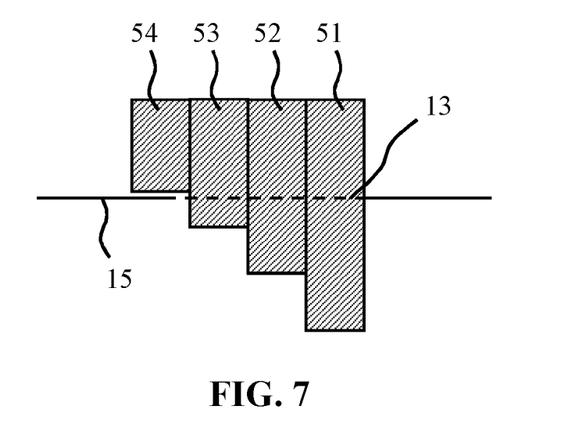
FIG. 7-10 schematically depict the engagement between part of the optical module and part of a LED carrier in example configurations according to embodiments.

FIG. 7 schematically depicts a first configuration in which the aperture 13 is formed in the carrier 10 such that each of the mounting elements or steps 51-53 of the mounting post 40 of the optical module 30 are received by the aperture 13, whilst mounting element or step 54 has landed on the landing region 15 adjacent to the aperture 13, such that the mounting height of the optical module 30 over the carrier 10 is defined by the step height of step 54.

Figure 8:
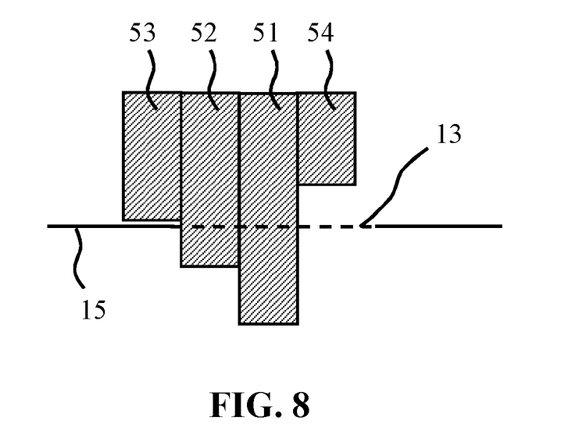

FIG. 8 schematically depicts a second configuration in which the aperture 13 is formed in the carrier 10 such that each of the mounting elements or steps 51, 52, 54 of the mounting post 40 of the optical module 30 are received by the aperture 13, whilst mounting element or step 53 has landed on the landing region 15 adjacent to the aperture 13, such that the mounting height of the optical module 30 over the carrier 10 is defined by the step height of step 53.

Figure 9:
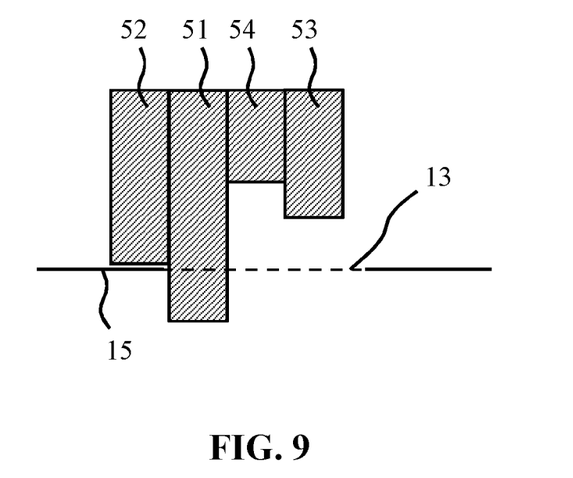

FIG. 9 schematically depicts a third configuration in which the aperture 13 is formed in the carrier 10 such that each of the mounting elements or steps 51, 53, 54 of the mounting post 40 of the optical module 30 are received by the aperture 13, whilst mounting element or step 52 has landed on the landing region 15 adjacent to the aperture 13, such that the mounting height of the optical module 30 over the carrier 10 is defined by the step height of step 52.

Figure 10:
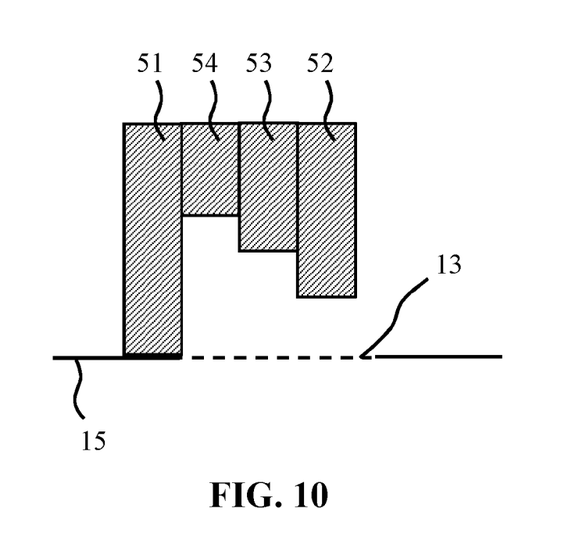
Figure 11:
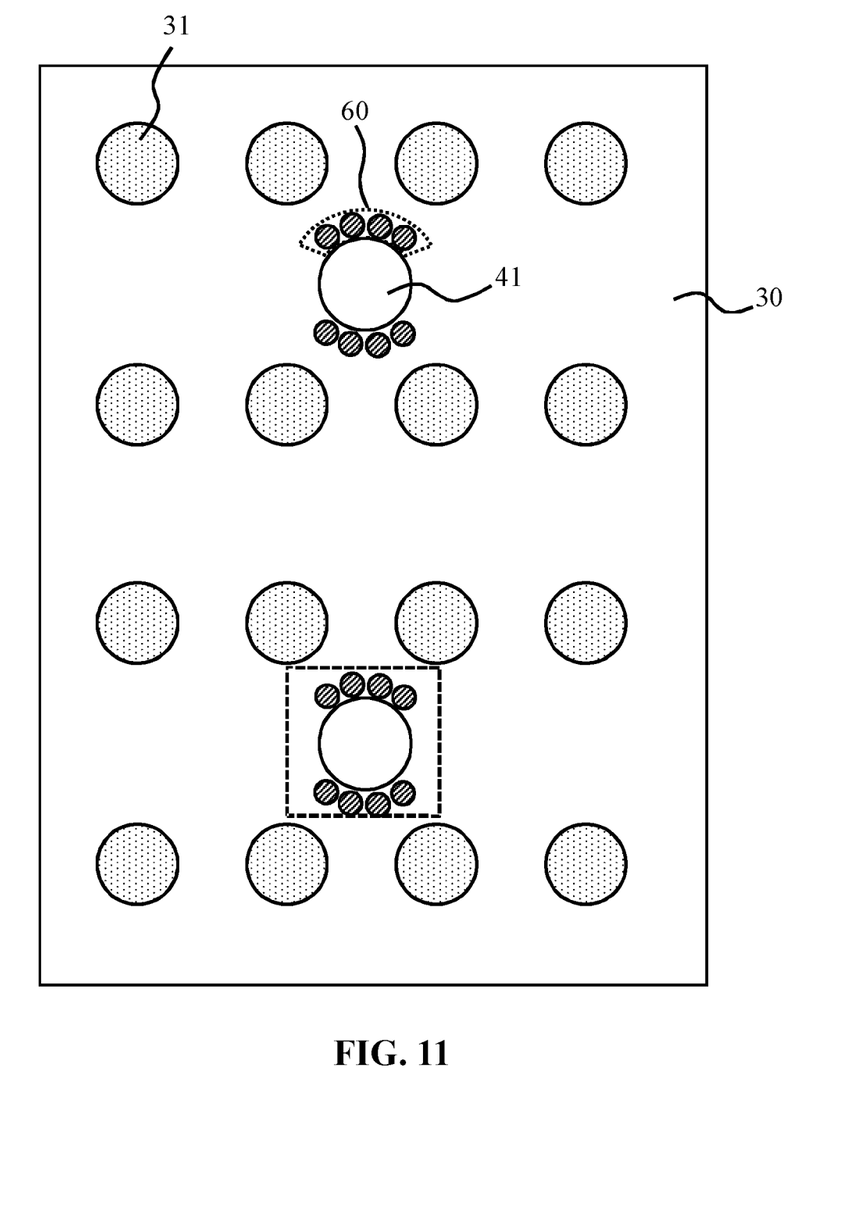
FIG. 11 schematically depicts a bottom view of an optical module for a LED assembly according to another embodiment.

FIG. 10 schematically depicts a third configuration in which the aperture 13 is formed in the carrier 10 such that each of the mounting elements or steps 52-54 of the mounting post 40 of the optical module 30 are received by the aperture 13, whilst step 51 has landed on the landing region 15 adjacent to the aperture 13, such that the mounting height of the optical module 30 over the carrier 10 is defined by the step height of step 51.

In this manner, during the assembly of the LED assembly 1, the mounting height of the optical module 30 may be set by correctly positioning and/or shaping the respective apertures 13 on the carrier 10 to select the step from the steps 51-54 of the respective stepped arrangements to contact the carrier 10 as explained above.

In the above embodiment, the size of the aperture 13 has been kept constant and the aperture 13 has been positioned (rotated) on the carrier 10 as a function of the height of the LEDs 20 mounted on the carrier 10. It should however be immediately apparent to the skilled person that several variations to this embodiment will be feasible. For example, the dimensions of the respective apertures 13 may be chosen such that only mounting elements or steps of the mounting posts 40 that have a larger step height than the mounting element of this mounting post to contact the carrier 10 to set the optical module 30 at its appropriate mounting height H3 are to be received by the aperture 13, such that the mounting elements or steps having a smaller step height than the mounting element contacting the carrier 10 may hover above the carrier 10 (rather than above an aperture 13).

For example, in the first configuration schematically depicted in FIG. 7, the mounting elements or steps 51-53 are all taller than the selected step 54, such that the aperture 13 may be dimensioned to receive each of the steps 51-53. In the second configuration schematically depicted in FIG. 8, the mounting elements or steps 51, 52 are all taller than the selected step 53, such that the aperture 13 may be dimensioned to receive steps 51, 52. In the third configuration schematically depicted in FIG. 9, the mounting element or step 51 is taller than the selected step 52, such that the aperture 13 may be dimensioned to receive step 51 only. In the fourth configuration schematically depicted in FIG. 10, none of the mounting elements or steps 52-54 are taller than the selected step 51, such that the aperture 13 may be omitted.

Figure 12:
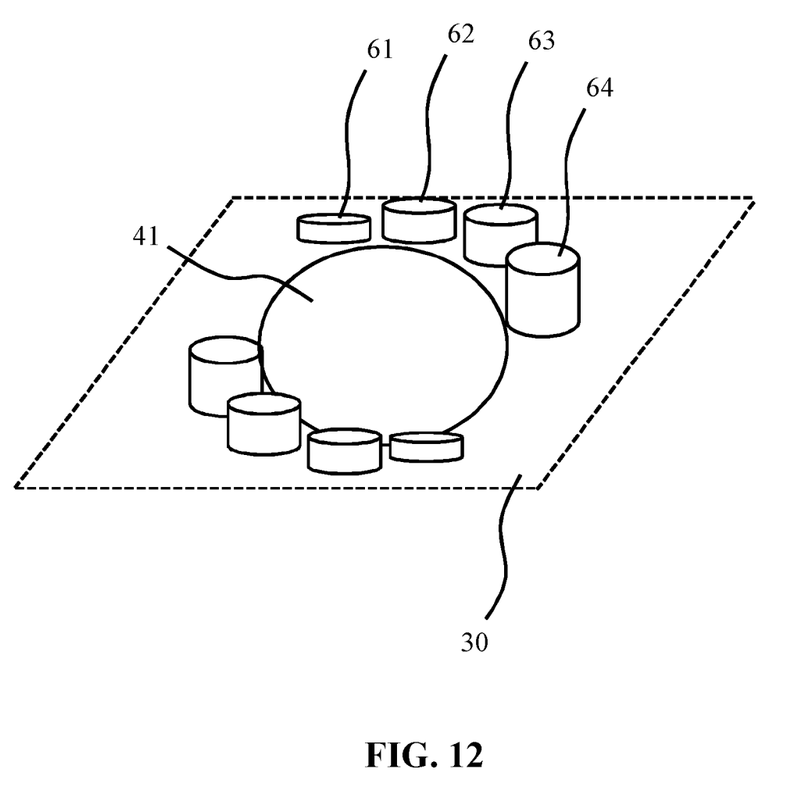
FIG. 12 schematically depicts a an aspect of the optical module of FIG. 11 in more detail.
Figure 13:
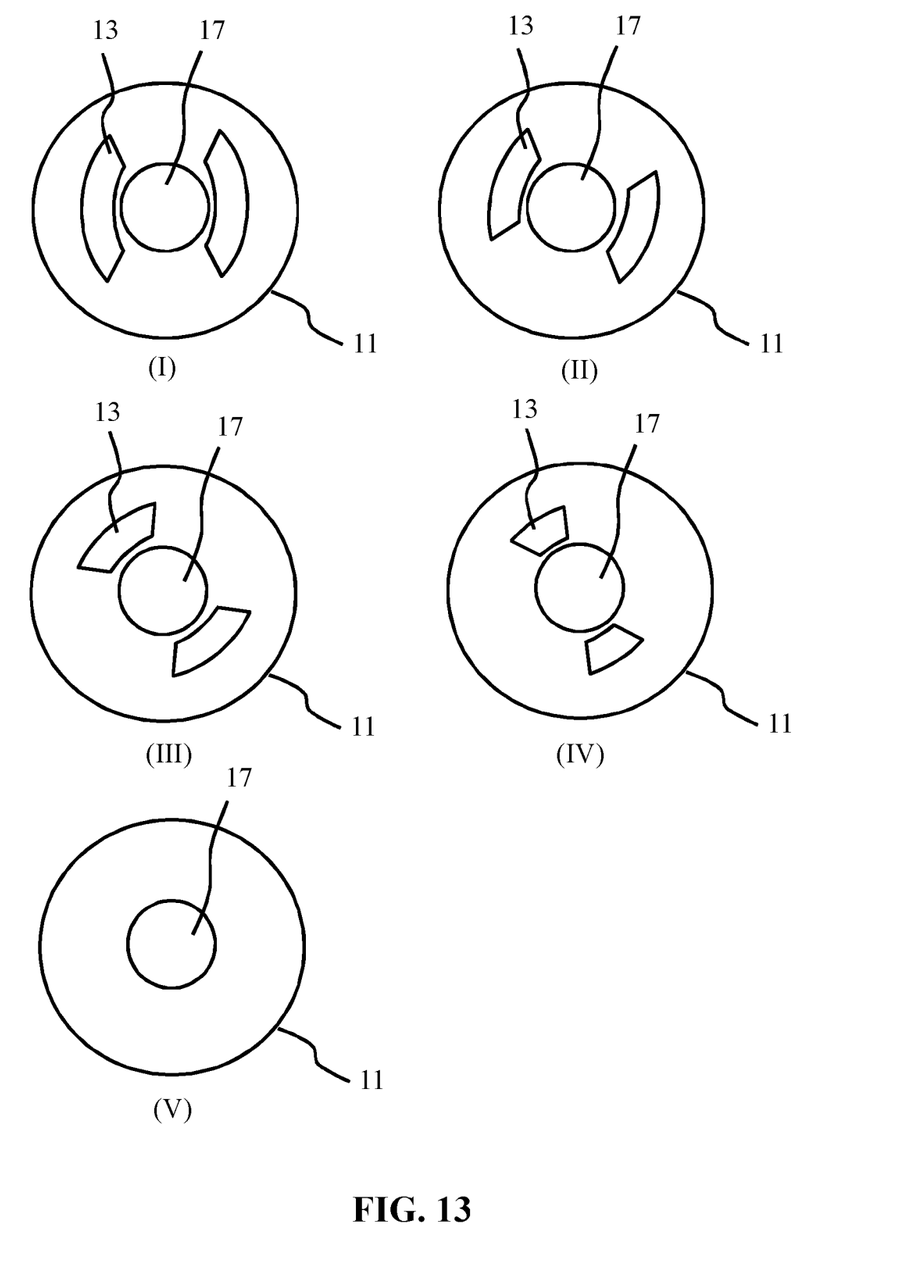
FIG. 13 schematically depicts different orientations of a LED carrier aperture arrangement for cooperating with the optical module of FIG. 11 according to an embodiment.

It is furthermore noted that the mounting elements 51-54 may not necessarily form part of a single or continuous mounting structure such as a mounting post 40. FIG. 12 schematically depicts an alternative embodiment of an optical module 30 and FIG. 13 schematically depicts the portion of the optical module 30 within the dashed box in FIG. 12 in more detail. In this embodiment, a mounting structure 60 is provided that contains a stepped arrangement in the form of a plurality of spatially separate mounting elements as mounting pins 61-64, which mounting pins have different heights for setting the mounting height of the optical module 30 over the carrier 10 as previously explained. As shown in FIG. 12 and FIG. 13, the mounting pins 61-64 are radially arranged around a screw hole 41 by way of non-limiting example; other arrangements, e.g. linear arrangements are equally feasible; any suitable arrangement of the mounting pins 61-64 in any suitable location of the optical module 30 may be contemplated. As previously explained and as schematically depicted in FIG. 5, the carrier 10 may comprise corresponding apertures 13, here arranged around a screw hole 17 by way of non-limiting example, for receiving at least a subset of the mounting pins 61-64. For example in the first configuration (I), the apertures 13 may be dimensioned and positioned such that all mounting pins 61-64 are received by the aperture 13, such that the optical module 30 directly contacts the carrier 10. In the second configuration (II), the apertures 13 may be dimensioned and positioned such that mounting pins 62-64 are received by the aperture 13 and mounting pin 61 contacts the carrier 10 in an area adjacent to the aperture 13. In the third configuration (III), the apertures 13 may be dimensioned and positioned such that mounting pins 63, 64 are received by the aperture 13 and mounting pin 62 contacts the carrier 10 in an area adjacent to the aperture 13, with mounting pin 61 hovering over the carrier 10. In the fourth configuration (IV), the apertures 13 may be dimensioned and positioned such that mounting pin 64 is received by the aperture 13 and mounting pin 63 contacts the carrier 10 in an area adjacent to the aperture 13, with mounting pins 61, 62 hovering over the carrier 10, whereas in the fifth configuration (V), the apertures 13 may be omitted because the tallest mounting pin 64 contacts the carrier 10, with mounting pin 61-63 hovering over the carrier 10.

As an alternative to the embodiment of the optical module 30 as schematically depicted in FIG. 3 and FIG. 4, each mounting post 40 may be rotatably mounted in the optical module 30, such that through rotation one of the mounting elements or steps 51-54 may be aligned with a reference point on the carrier 10, e.g. a surface portion of the carrier 10 onto which the step selected from the steps 51-54 may be positioned. This for example facilitates the use of a universal carrier 10 having a plurality of fixed apertures 11 for receiving the remainder of the mounting elements or steps 51-54 in fixed locations in the carrier 10, such that through rotation of the mounting post 40, the appropriate steps 51-54 to be received by the aperture 11 as well as the step to be positioned on a surface portion 15 adjacent to such an aperture may be selected. In case of a mounting post 40 comprising multiple sections 50, the mounting post 40 is preferably rotationally symmetric, i.e. the multiple sections 50 are identical, such that identical steps are regularly spaced across the mounting surface 45 of the mounting post 40, which may increase the stability of the mounting post 40 and the optical module 30 when positioned at on a carrier 10. The mounting post 40 may have a circular cross-section in the plane of the optical module 30 to facilitate such rotation.

Figure 14:
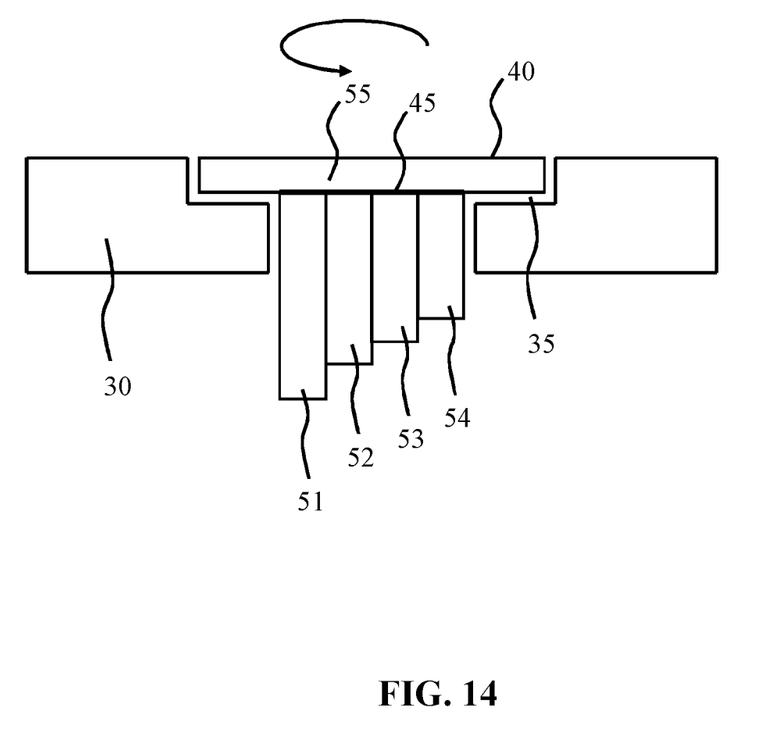
FIG. 14 schematically depicts a cross-sectional view of an aspect of an optical module for a LED assembly according to an embodiment.

FIG. 14 schematically depicts an example embodiment of how the mounting post 40 may be mounted in the optical module 30. In this example embodiment, the optical module 30 comprises a recess 35 extending through the optical module 30. The recess 35 has a wider upper section in which a lid 55 of the mounting post 40 is mounted. A body of the mounting post 40 including the mounting surface 45 having the stepped portions (mounting elements) 51-54 extends through a narrower section of the recess 35. Rotation of the mounting post 40 is achieved by rotating the lid 55 within the wider upper section of the recess 35, which rotates the body of the mounting post 40 within the narrower section of the recess 35 by virtue of the body extending from the lid 55. It should be understood that this arrangement is shown by way of non-limiting example only and that the skilled person would have no difficulty in providing alternative arrangements to facilitate the rotation of the mounting post 40 within the optical module 30.

The LED assembly 1 according to embodiments of the present invention may be advantageously used in a luminaire such as an outdoor luminaire, e.g. an outdoor lamp, a street lantern, and so on, where the LED assembly 1 may be positioned within the housing of the luminaire, which housing may be a weatherproof, e.g. watertight or waterproof, housing in case of the luminaire being an outdoor luminaire.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An optical module for a LED assembly, the optical module comprising a plurality of optical elements and a plurality of mounting structures, each mounting structure comprising a stepped arrangement of mounting elements, in which each mounting element defines a step of the stepped arrangement, each step defining a different mounting height for the optical module, and wherein each mounting structure is rotatable.

2. The optical module of claim 1, wherein each mounting structure comprises a plurality of sections defining a surface of the mounting structure, each section comprising said stepped arrangement.

3. The optical module of claim 2, wherein said sections combine to define a perimeter of the mounting structure.

4. The optical module of claim 1, wherein each mounting element is a mounting pin extending from the optical module.

5. The optical module of claim 1, further comprising a screw hole extending through the optical module and at least one stepped arrangement of mounting elements is arranged around a perimeter section of said screw hole.

6. The optical module of claim 1, wherein the optical module is made of an optical grade polymer.

7. A LED assembly including a carrier comprising a pattern of LEDs and at least one optical module of claim 1 positioned on the carrier such that each optical element is optically aligned with a respective one of said LEDs and one of the steps of the respective mounting structures contacts the carrier.

8. The LED assembly of claim 7, wherein the carrier comprises a plurality of apertures, each aperture shaped to receive part of the stepped arrangement of one of said mounting structures such that one of the mounting elements of said stepped arrangement contacts the carrier adjacent to said aperture.

9. The LED assembly of claim 7, comprising a plurality of said optical modules, said optical modules combining to form an optical assembly.

10. A luminaire comprising a housing, said housing comprising the LED assembly of claim 7.

11. The luminaire of claim 10, wherein the luminaire is an outdoor luminaire.

12. A method of assembling a LED assembly, the method comprising:
   providing an optical module comprising a plurality of optical elements and a plurality of mounting structures, each mounting structure comprising a stepped arrangement of mounting elements, in which each mounting element defines a step of the stepped arrangement, each step defining a different mounting height for the optical module;
   providing a carrier comprising a pattern of LEDs; and
   positioning the optical module on the carrier such that one of the mounting elements of the respective mounting structures contacts the carrier and each optical element is optically aligned with one of said LEDs
   wherein each mounting structure is a rotatable mounting structure, the method further comprising setting the mounting height (H3) of the optical module by rotating each mounting structure to select the step of the plurality of steps to contact the carrier.

13. The method of claim 12, wherein providing said carrier comprises forming a plurality of apertures in said carrier, each aperture shaped to receive part of the stepped arrangement of one of said mounting structures such that a selected one of the mounting elements of said stepped arrangement contacts the carrier adjacent to said aperture.

* * * * *